Joseph Burnsweig, Jr.,
INVENTOR.
BY
J. K. Haskell
ATTORNEY.

Joseph Burnsweig, Jr.,
INVENTOR.
BY.
J. K. Haskell
ATTORNEY.

Joseph Burnsweig, Jr.,
INVENTOR.
BY
J. K. Haskell
ATTORNEY.

United States Patent Office 3,460,067
Patented Aug. 5, 1969

3,460,067

PRECISION WIDEBAND FREQUENCY MODULATOR FOR INJECTION LOCKING A TUNEABLE RF SOURCE

Joseph Burnsweig, Jr., Los Angeles, Calif., assignor to Hughes Aircraft Company, Culver City, Calif., a corporation of Delaware Filed May 10, 1966, Ser. No. 549,066
Int. Cl. H03k 7/06
U.S. Cl. 332—9 12 Claims

ABSTRACT OF THE DISCLOSURE

A system for generating programmed precision radio frequencies wherein, in one embodiment, a driver stage is responsive to the reception of a programmed voltage waveform from a programmer to tune a tuneable RF source to a coarse frequency in accordance with the voltage waveform. A precision frequency modulator generates harmonics of a precision reference frequency which are supplied to the tuneable RF source through a hybrid circulator to injection-lock the coarsely tuned tuneable RF source precisely to the frequency required by the programmed voltage waveform. At the same time that the tuneable RF source is injection-locked in frequency, the starting phase of the required frequency is precisely related, or phase coherent, to the phase of the reference frequency whose harmonics are supplied via the circulator.

This invention relates to radio frequency modulators and more particularly to a wideband radio frequency modulator for a tuneable source of RF to generate precision frequencies which are adjustable in frequency and time.

In radar and communications systems using coded radio frequency (RF) intelligence, the operational relationships between the transmitter and receiver usually invoke limitations on bandwidth, frequency stability, and circuitry dynamics. As an example, in "chirp" radar systems using pulse compression two basic forms of frequency modulation (FM) are employed, in the transmitter excitation, and are commonly referred to as "passive" or "active" FMing. The passive technique frequency modulators employ a narrow pulse to impulse a chirp filter network, thus providing a varying output voltage with time that contains the desired phase shifted frequencies of the network. This network on transmission acts as a dispersive element and on reception this same network acts as a compressive element. Time sharing of one network while eliminating the problem of matching characteristics in duplicate filters, does introduce an additional transmission phase equalization problem. Multiplexing creates other design compromises and increases circuit complexity to compensate for distortion caused by such a passive network.

In the "active" frequency modulation form of chirp radars, a tuneable oscillator source is used, usually a voltage tuned source. The period of time that the voltage is applied to the oscillator varies the time duration which the oscillator is to oscillate at a predetermined frequency. The accuracy of the frequency output of the oscillator is determined by the precision of the power supply and the time response of the oscillator. Thus at any time during transmission, the voltage will determine the frequency transmitted, making the precision of the frequency purely related to the predictable accuracy and stability of a power supply. This form of active frequency modulator only approximates the frequency desired to be transmitted.

It is desirable in chirp radar as well as other pulse compression radars, such as radar mapping, to use a transmitter which can be either continuously operated or turned off and on and have a precision, predictable, and stable frequencies across a wide bandwidth.

Similar problems arise in high speed computers and communications systems where FM intelligence is transmitted in a coded, prescribed, or random manner and fast decoding access is required.

The present invention overcomes the inaccuracies, instabilities and complexities introduced by the prior art in RF modulators. The wideband coherent frequency modulator permits simplicity and precision in a wideband coherent frequency modulator of a tuneable RF source without introducing new complexities.

Accordingly, it is an object of the present invention to provide a wideband coherent frequency modulator.

Another object of the present invention is to provide a wideband coherent frequency modulator capable of continuous wave or pulsed operation.

A further object of the present invention is to provide a precision wideband frequency modulator for generating a coded variety of radio frequencies initiated with the same starting phase as a reference frequency.

It is also an object of the present invention to provide an improved frequency modulator for pulse compression radar systems.

Briefly, in accordance with one embodiment of the coherent frequency modulator, a programmer, a tuneable source of RF, a driver, a precision frequency modulator, and a hybrid circulator are employed. The programmer generates a sawtooth signal or coded voltage waveform which is supplied to the driver. The driver could be a mechanical force employing a shaft or a programmable electrical power supply. The driver responds by tuning the tuneable source of RF in accordance with the code and the frequency generated by the oscillator is coarsely tuned to the desired (or coded) frequency. Since it is not predictable because of variations in accuracy of the driver as to which frequency the source is oscillating, then some means of making the oscillator frequency precise and predictable is required. The precision frequency modulator, according to one embodiment, utilizes a stable low-frequency oscillator and a frequency multiplier. Low frequency oscillators, such as crystals in a temperature controlled oven, will generate a precision frequency over a long period of time. The frequency multiplier multiplies the precision reference frequency by predetermined integers to obtain harmonics of the precision reference frequency and these multiplied frequencies correspond to the bandwidth operation of the tuneable source. At the same time that the tuneable source is being tuned, all frequencies from the multiplier are supplied to the tuneable source through a hybrid circulator to injection lock the coarsely tuned tuneable source precisely (i.e.: absolutely) to the coded frequency. At the same time that the tuneable source is injection locked in frequency the starting phase of the tuned frequency is precisely related to the phase of the reference frequency supplied via the circulator. Thus, as the tuneable oscillator is coarsely tuned to a predetermined frequency, a precise corresponding frequency is supplied to the tuneable source to change the frequency of the tuneable source to the precise frequency.

The features, objects, and advantages of the present invention can be ascertained from the following description of exemplary embodiments thereof illustrated in the accompanying drawings wherein like reference characters refer to like parts, and wherein.

Figure 3C:
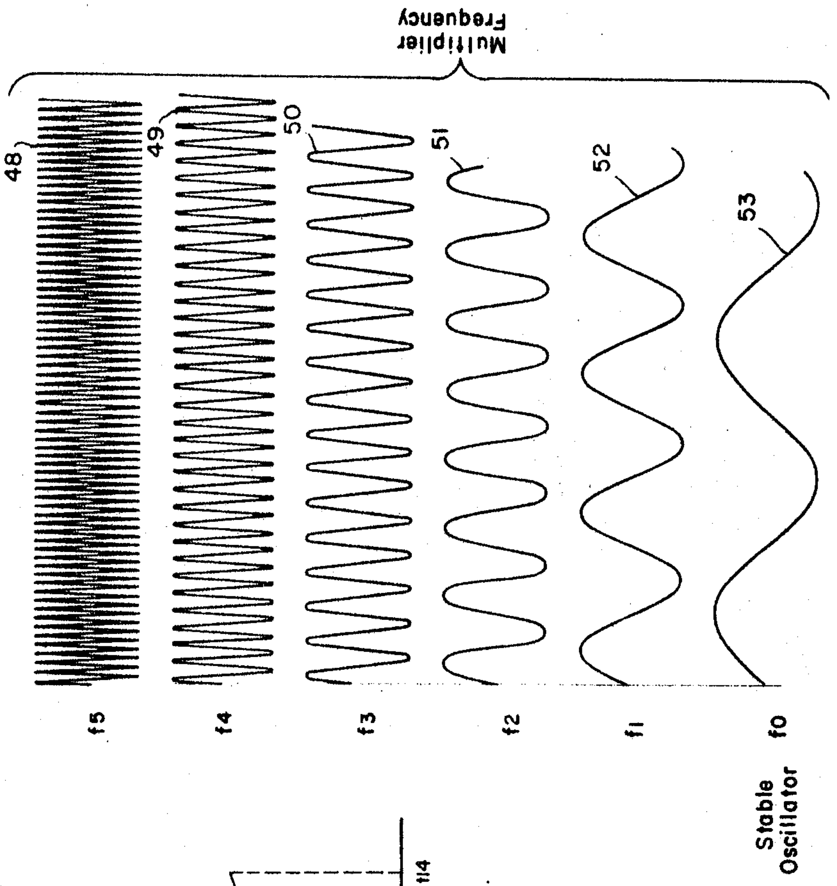
Figure 3A:
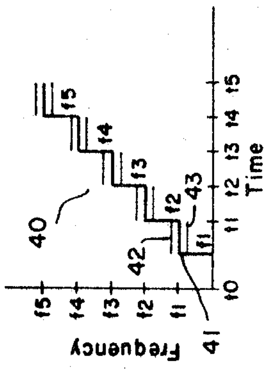
Figure 3A:
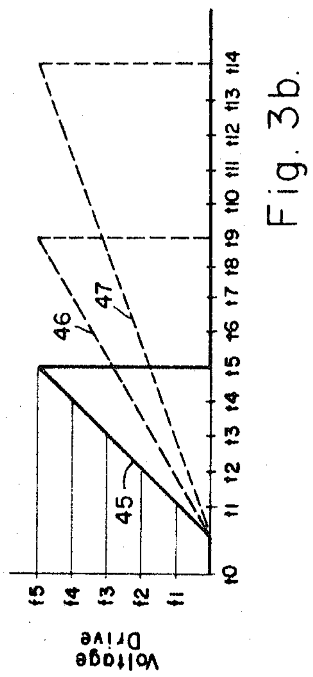
Figure 4A:
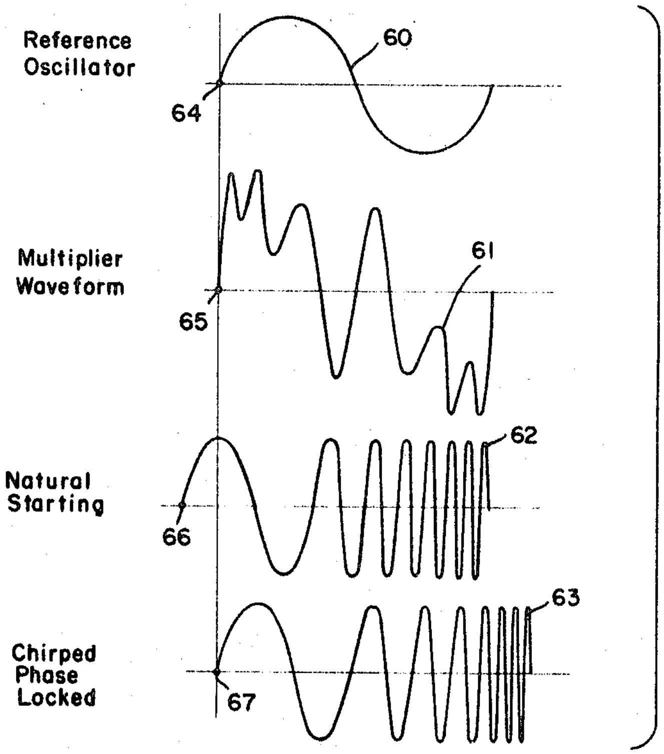
Figure 4B:
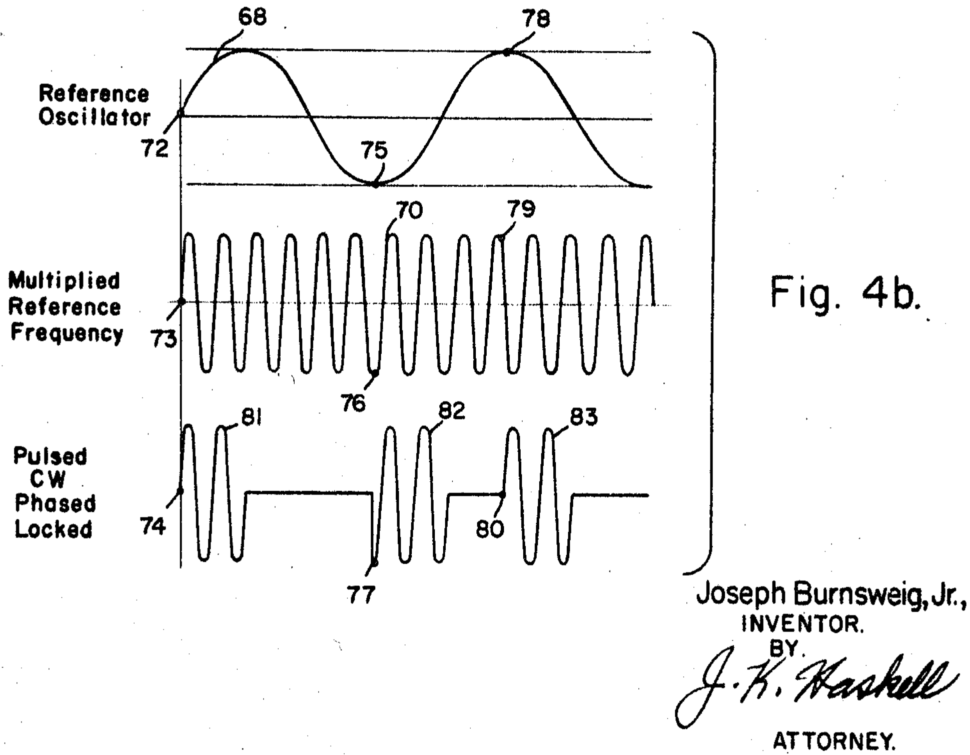

FIGS. 3*a* through 3*c* illustrate the coding and waveforms generated and employed according to the principles of the present invention; and FIGS. 4*a* and 4*b* illustrate the chirped phase-locked and the pulsed CW phase-locked signals generated by the use of the wideband coherent frequency modulator.

Figure 1:
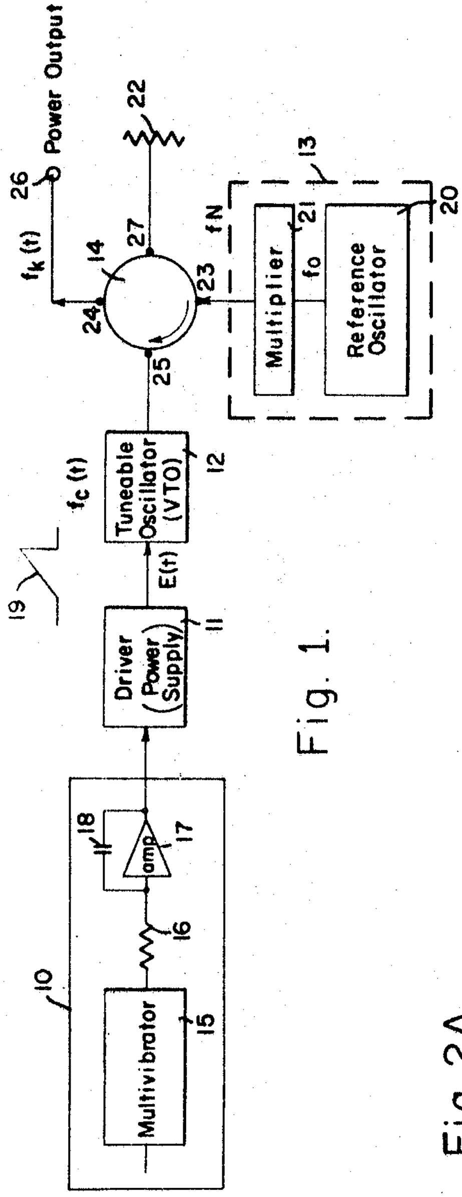
FIGURE 1 is a schematic block diagram broadly illustrating a wideband modulator for coherently generating programmable RF intelligence embodying the principles of the present invention.

The FIG. 1 illustrates an embodiment of a continuous wave (CW) coherent frequency modulator. The programmer 10 provides a coded signal to the driver 11, which applies a driving force $E(t)$ to the coarsely tuned or tuneable oscillator 12 to coarsely tune the oscillator 12 to a frequency determined by the code applied to the driver 11. In the illustration, the programmer 10 is of a sawtooth wave generator, comprised of a conventional multivibrator 15 and the integrator circuit composed of a resistance 16, a feedback capacitor 18, and an amplifier 17. The multivibrator 15 generates a square wave signal which is integrated to produce the sawtooth signal applied to the driver 11. A driver 11 may be a mechanical shaft servomechanism device or an electrically variable power supply. In the case of a power supply (driver) a voltage $E(t)$ is applied to a voltage tuneable oscillator (VTO) for tuning.

The tuneable oscillator 12 may be a mechanically or electrically tuneable magnetron, klystron, backward wave oscillator, or similar tuneable oscillatory device, all of which are well known to those familiar with radar and communications art. A discussion of tuneable magnetrons, etc., is found in the book "Introduction to Radar Systems," pp. 199–259, by M. I. Skolnik, McGraw-Hill, 1962.

The tuneable oscillator 12 is only coarsely tuned, because of the unstable characteristics of the driver 11. For example, the tuning sensitivities of voltage tuned oscillators are typically 1 to 2 mc./volt. If the tuning range of the VTO is 2 to 4 kmc., and 2 mc./volt, the initial voltage (for 2 kmc.) is approximately 500 volts. The power supply must be linear for the entire bandwidth of the VTO at any instant of time, which is extremely difficult, if not impossible, to achieve for accuracies of $\pm 1$ mc. for a 2 kmc. bandwidth. So, the problem of generating precision frequencies is difficult for tuneable oscillators as well as precision selection at any time across the tuneable bandwidth.

The precision frequency modulator 13 generates a spectrum of frequencies, which encompass the tuning band of the tuneable oscillator 12. This spectrum is generated by the combination of a low frequency stable reference oscillator 20 and a harmonic generator or multiplier 21 in this embodiment. A low frequency stable oscillator 20 is used here because of the well known stability characteristic of low frequency sources, such as a crystal in a temperature controlled oven. Under such conditions the frequency is considered "coherent" because at any instant of time the frequency will be exactly the same. In the oscillator art, stable sources are found which are at low frequency and fixed frequency. Tuneability at RF and stability at the same time is an anomaly, and thus coherent tuneable RF oscillators have been considered as paradoxical previous to this invention.

The multiplier 21 is coupled to the low frequency oscillator 20, which generates the frequency $f_0$, and multiplies this $f_0$ to a series of frequencies $f_N$. Two articles "Harmonic Generation With Ideal Rectifiers" by C. H. Page in Proceedings of the IRE, 46, 1958, and "Harmonic Generation with Non-Linear Reactances," by K. C. Chang, RCA Review, XIX, 1958, describes the type of multipliers and harmonic generators suitable for use with this invention. Conventional varactor multipliers are also suitable.

The frequencies $f_N$ include the harmonics of $f_0$, or may be other predetermined multiples of $f_0$. As an example, assume $f_0$ to be 5 mc., the multiplier 21 would multiply this by the multiples 2, 5, 5, 5 to get 1250 mc. with a 5 mc. adjacent frequency respectively, and the harmonics of the 5 mc. reference frequencies. A single frequency or a comb spectrum could be generated by the multiplier to have a series of frequencies at some fixed spacing (e.g.: 10 mc. apart).

This spectrum of frequencies is injected into the coarsely tuned oscillator 12 via the hybrid circulator 14. Hybrid circulators are well known devices and are broadly categorized as nonreciprocal devices, because of the highly directional characteristics. A four part hybrid circulator 14 is shown having the ports 23, 24, 25 and 27, with the port 27 connected to a matched load 22 to ensure that undesired reflections from the tuneable oscillator 12 are dissipated. A three port circulator could also be used, or an equivalent nonreciprocal waveguide device. The spectrum energy enters port 23, is circulated to port 25 into the tuneable oscillator 12 to injection lock the frequency of the tuneable oscillator 12 precisely to the frequency commanded by the program code.

Injection locking or "tickling" phenomenon refers to the fact that the introduction of an external driving force may result in the build-up of forced oscillations at the externally introduced frequency; and at the same time suppressing free (natural) oscillations. This suppression phenomenon in vacuum tubes is due to the nonlinear properties of the space charge. If forced oscillations are established, and are sufficient in amplitude to bring the oscillator close to saturation, there is little, if any, energy remaining for a weak signal (noise) to initiate a build up into oscillation. In the present invention, the strength of the injected signal is stronger than the noise, and thus the oscillator oscillates precisely at the frequency of the injected signal, which is near the coarsely tuned frequency. Also, the starting phase of a noise tuned tuneable oscillator is random. In the time domain, an oscillator starting phase may be anywhere between 0 and 360° from the previous oscillating phase. The present invention not only precisely locks the frequency, as in frequency modulators, but the alteration of frequency also alters the starting phase such that the starting phase is referenced (locked) to the starting excitation phase.

In the embodiment shown in FIG. 1, the tuneable oscillator 12 is programmed to oscillate at the frequency $f_K$ at a time $t$. However, the driving signal $E(t)$ creates the conditions for oscillation to be at the coarse frequency $f_C$ ($f_C = f_K \pm \Delta f$) at the same time as $t$, which may be above or below the desired programmed frequency $f_K$ by the frequency error of $\Delta f$. By injecting the frequencies $f_N$ which includes $f_K$, the oscillator 12 frequency is changed from $f_C$ to $f_K$ at time $t$ by injection locking, and the starting phase will be referenced to $f_0$, because the $f_N$ frequencies are derived from $f_0$. The power output 26 is at frequency $f_K$, and precisely the frequency commanded by the code and is coherent. Coherent in the sense that at any time a frequency $f_K$ is commanded, it will be precisely generated by the tuneable oscillator 12, and phase referenced (coherent with) the starting phase of the reference oscillator 20.

Figure 2:
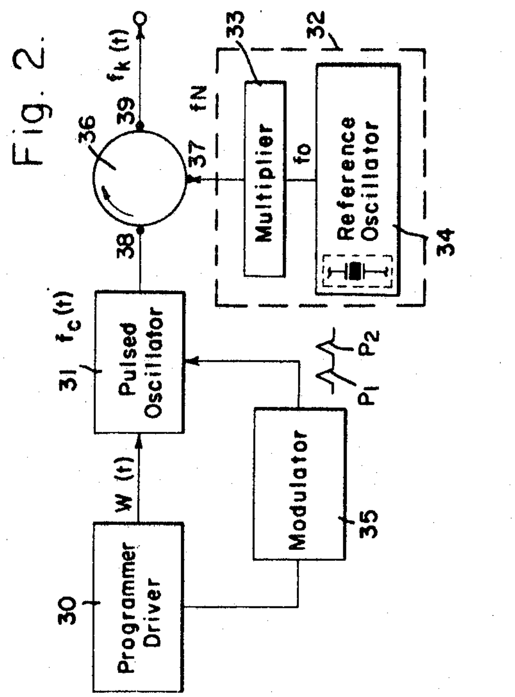
FIG. 2 is a schematic block diagram illustrating the pulsed coherent wideband modulator embodying the principles of the present invention.

Turning now to FIG. 2, there is shown a wideband coherent modulator operating with a pulsed tuneable oscillator. A programmer and driver 30, similar to items 10 and 11 shown in FIG. 1, generates a program (coded) signal $\omega(t)$ to force the pulsed tuneable oscillator 31 into oscillation at the coarse frequency $f_C(t)$. A modulator 35 is synchronized with the programmer and driver 30, and generates the trigger pulses $P_1$ and $P_2$ (etc.) to turn the tuneable oscillator 31 on and off. Tuneable oscillators, such as magnetrons, have a grid provided for pulsing, and it would be to such grid that the modulator trigger pulses are routed. The spectrum of frequencies $f_N$ are constantly applied to the pulsed tuneable oscillator 31, so that at any instant of time the coded frequency $f_K(t)$ is present to injection lock the tuneable oscillator 31 to the precise frequency $f_K(t)$ during the pulsed interval (i.e.: on-time). A precision frequency modulator 32 generates the spectrum of frequencies $f_N$ which encompass the tuning band of the pulsed tuneable oscillator 31. This spectrum is generated by the combination of a low frequency stable reference oscillator 34 and a multiplier 33 in this embodiment. A three port hybrid circulator 36, a variation on the well-known nonreciprocal devices, is shown to route the frequency spectrum $f_N$ signal from the precision frequency modulator 32 to the pulsed oscillator 31.

As an example, assume that at time $t$, the programmer 30 code commands the tuneable oscillator 31 to oscillate 31 at $f_1$, the drive force tunes the oscillator to a frequency of $f_1 \pm \Delta f$, where $\Delta f$ is the frequency accuracy tolerance of the drive force $\omega$. With the precise frequency $f_1$ available from the spectrum of $f_N$, the oscillator 31 at the time of the pulse $P_1$ is injection locked precisely to the frequency $f_1$, without the frequency tolerance $\Delta f$ (i.e.: finely tuned). Should the next frequency be $f_2$ at time $t_2$, similar operation results, and any frequency is coherent across the entire bandwidth of the tuneable oscillator 31, even though pulsed operation exists. In addition the starting phase of the pulsed frequencies are phase reference to the reference oscillator 34.

Figure 2A:
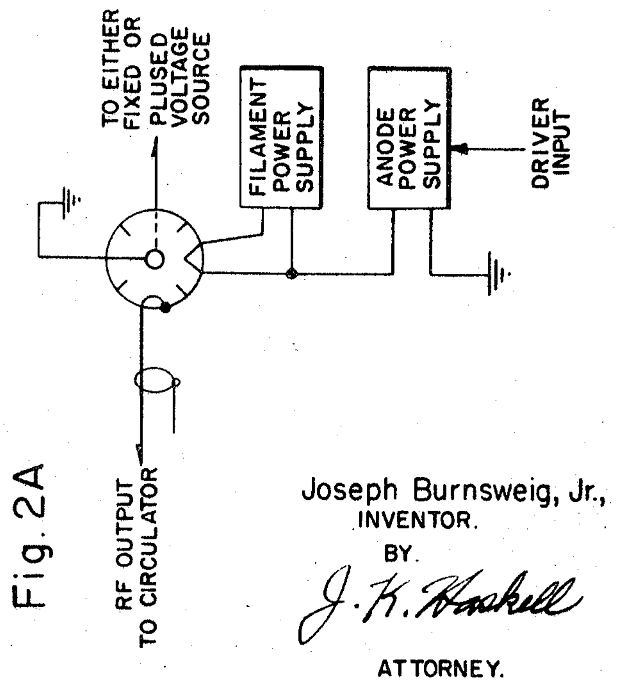
FIG. 2A is a schematic and block diagram illustrating one type of magnetron which may be used in either FIG. 1 or FIG. 2.

FIG. 2A illustrates one type of voltage tuneable magnetron which may be used in the oscillator 12 of FIG. 1 or the oscillator 31 of FIG. 2. When CW operation, as shown in FIG. 1, is desired, the control grid of the magnetron of FIG. 2A is connected to a fixed voltage source. When pulsed operation, as shown in FIG. 2, is desired, the control grid of the magnetron of FIG. 2A is connected to a pulsed voltage source to allow RF power to be applied to the circulator only during the pulsed interval.

In FIG. 3*a* through 3*c* a series of relationships between the code forms, drive, and frequencies generated by the precision frequency modulator illustrated in FIG. 1 and FIG. 2. FIG. 3*a* illustrates a frequency versus time plot of a "stepped" code 40 and the resulting frequencies $f_1$ through $f_5$. By way of illustration, assume the code demands frequency $f_1$ (41), then the drive signal $E(t)$ from the driver 11 forces the tuneable oscillator 12 shown in FIG. 1 to oscillate somewhere between the frequencies 42 and 43. The multiplier 21 frequencies $f_1$ through $f_5$ respectively of FIG. 3*c* are available, so the tuneable oscillator 12 is locked to frequency $f_1$. Similar operation occurs with the remaining frequencies $f_2$ through $f_5$. Although only five different frequencies are illustrated, it is indicated that any frequency across the tuneable bandwidth can be employed in accordance with the principles of the invention.

FIG. 3*b* illustrates variations on frequency modulation using the commonly employed sawtooth signal for frequency modulation. Sawtooth waveforms 45 through 47 have different slopes, which, for example, affect the time at which the tuneable oscillator 12 tunes to a given frequency $f_1$ through $f_5$. Depending on the slope, the oscillator 12 may be rapidly tuned as shown by 45, or more slowly according to the slopes 46 and 47. The capability to rapidly tune to coherent frequencies over a broad bandwidth presents a significant contribution to the RF modulation art.

Referring now to the illustration in FIGS. 4*a* and 4*b* there is shown respectively a chirped and a pulsed CW coherent frequency modulation waveforms. FIG. 4*a* shows the sine wave 60 representing the low frequency oscillator (reference) having the starting phase at point 64. The multiplier signal 61 is illustrated by a waveform rich in harmonics of the reference and has the same starting phase 65 as the reference. The natural starting phase point 66 of the chirped oscillator signal 62 is out of phase with the reference. By the injection locking of the present invention, the chirped waveform 63 has the same starting phase 67 as the reference, and all frequencies are coherent.

FIG. 4*b* illustrates the pulsed coherent operation according to one embodiment of the present invention. The series of pulses 81 through 83 are phase referenced to the multiplied frequency waveform 70 (one of many frequencies) which has been derived from the reference oscillator frequency 68. With a continuous frequency being generated by the multiplier, the phase reference of each pulse is locked to the reference. The same results arise if the tuneable oscillator is tuned to different frequencies and pulsed.

What is claimed is:

1. A system for generating programmed continuous wave precision radio frequencies comprising:
- programmer means for generating a coded signal containing time duration and frequency commands in a predetermined coded waveform;
- driver means coupled to said programmer and responding to the coded signal for providing a coarse driving force in accordance with the coded signal;
- a tuneable frequency source coupled to said driver means and responding to the driving force to generate an output signal of variable frequencies as determined by said driving means;
- a precision frequency modulator for generating a spectrum of frequencies precisely matching the frequencies commanded by the coded signal concurrently with the operation of said tuneable source; and
- circulator means coupled between said tuneable source and said precision frequency modulator for transferring the precision frequency spectrum signal to said tuneable source for injection locking the frequency of the tuneable source to the precise frequency commanded by the coded signal, said injection locking also rendering the starting phase of the output signal of variable frequencies to be referenced to the starting phase of the frequencies in said spectrum.

2. In the system of claim 1 wherein said precision frequency modulator comprises:
- a low frequency stable oscillator for providing a reference frequency; and
- harmonic generator means coupled to said stable oscillator and to said circulator means for generating a series of frequencies, said frequencies including harmonics of said reference frequency.

3. In the system of claim 2 wherein said low frequency stable oscillator is a temperature controlled crystal oscillator.

4. In a system for generating continuous wave precision RF frequencies according to claim 1 wherein said driver means comprises an electrically tuneable power supply.

5. In a system for generating continuous wave precision RF frequencies according to claim 1 wherein said tuneable source comprises a voltage tuneable oscillator.

6. In a system for generating continuous wave precision RF frequencies according to claim 5 wherein said voltage tuneable oscillator is a voltage tuneable magnetron.

7. In a system for generating continuous wave precision RF frequencies according to claim 1 wherein said circulator means comprises:
- a four port nonreciprocal hybrid having first, second, third and fourth ports in an arrangement whereby energy entering said first port travels toward said second port and energy entering said second port exits from said third port, said first port being coupled to said precision frequency modulator, said second port being coupled to said tuneable source, said third port providing an output for said tuneable source and said fourth port being impedance matched to dissipate reflections from said second port.

8. A system for generating pulsed precision RF frequencies comprising:

programmer means for generating a coded signal containing time duration and frequency commands in a predetermined coded waveform;

an electrically tuneable power supply coupled to said programmer and responding to the coded signal for providing a coarse driving voltage signal in accordance with the code signal;

a voltage tuneable oscillator coupled to said power supply and responding to the coarse driving voltage signal to generate an output signal of variable frequencies as determined by said power supply;

a modulator coupled between said programmer and said tuneable oscillator for generating triggering pulses to regulate the time of oscillation of said tuneable oscillator;

a precision frequency modulator, including a reference frequency oscillator coupled to a harmonic generator, for generating a spectrum of frequencies precisely matching the frequencies commanded by the coded signal concurrently with the operation of said tuneable oscillator; and circulator means coupled between said tuneable oscillator and said precision frequency modulator for transferring the precision frequency spectrum signal to said tuneable oscillator for injection locking the frequency of said tuneable oscillator to the precise frequency commanded by the coded signal.

9. A system for generating programmed precise radio frequencies comprising:

programming means for producing a command signal corresponding to a selected one of a plurality of precise programmable radio frequencies;

a voltage tuned oscillator having a tuneable bandwidth and being coupled to said programming means, said voltage tuned oscillator having the capability of wideband operation and being responsive to the command signal for tuning itself to a frequency approximating the precise frequency;

a low frequency stable oscillator for providing a coherent reference frequency;

a harmonic generator being coupled to said stable oscillator for continuously generating a series of frequencies derived from the coherent reference frequency, corresponding to the programmable frequencies, and being phase referenced to the reference frequency;

a four-port hybrid circulator having first, second, third, and fourth ports in an arrangement whereby energy entering said first port travels toward said second port and energy entering said second port exits from said third port, said first port being coupled to said harmonic generator, said second port being coupled to said voltage tuned oscillator, said third port providing an output for said voltage tuned oscillator and said fourth port being impedance matched to dissipate reflections from said second port, said circulator transferring the series of frequencies to said voltage tuned oscillator to render the voltage tuned oscillator frequency coherent with the selected one of the plurality of programmable frequencies across the tuneable bandwidth of said voltage tuned oscillator.

10. In a system for generating continuous wave precision RF frequencies according to claim 1 wherein said tuneable source comprises a mechanically tuneable oscillator.

11. The system of claim 1 further including modulation means coupled between said programmer means and said tuneable frequency source for generating triggering pulses to regulate the time of oscillation of said tuneable frequency source in order to enable the system to generate output pulsed precision RF frequencies.

12. The system of claim 9 further including modulation means coupled between said programming means and said voltage tuned oscillator for generating triggering pulses to regulate the time of oscillation of said voltage tuned oscillator in order to enable the system to generate output pulsed precision RF frequencies.

References Cited

UNITED STATES PATENTS

| | | | | |
|---|---|---|---|---|
| 3,095,543 | 6/1963 | McColl | 332—29 | X |
| 3,136,950 | 6/1964 | Mackey | 333—1.1 | X |
| 3,149,292 | 9/1964 | Gamble et al. | 332—51 | X |
| 3,195,051 | 7/1965 | Chang | 333—1.1 | X |
| 3,304,518 | 2/1967 | Mackey | 332—19 | |

FOREIGN PATENTS 269,402 11/1964 Australia.

ALFRED L. BRODY, Primary Examiner

U.S. Cl. X.R.

325—445; 330—4; 331—55; 332—14, 19, 29